United States Patent [19]

Reachek

[11] 3,787,131

[45] Jan. 22, 1974

[54] PIPE ANCHOR

[76] Inventor: Frederick S. Reachek, 1259 Charles Ave., Lakewood, Ohio 44107

[22] Filed: Apr. 5, 1972

[21] Appl. No.: 241,270

[52] U.S. Cl. ............................ 403/234, 403/290
[51] Int. Cl. .............................................. F16b 7/04
[58] Field of Search ..... 287/56, 54 C, 54 A, 124, 2; 85/75

[56] References Cited
UNITED STATES PATENTS

| 1,404,522 | 1/1922 | Harris | 287/54 C |
| 3,404,504 | 10/1968 | Taylor | 85/67 |
| 3,674,293 | 7/1972 | Parsons | 287/124 X |

FOREIGN PATENTS OR APPLICATIONS

| 24,292 | 11/1930 | Australia | 287/54 C |
| 1,118,050 | 3/1956 | France | 287/54 B |

*Primary Examiner*—Andrew V. Kundrat
*Attorney, Agent, or Firm*—Roy F. Hollander

[57] ABSTRACT

A device for connecting a pair of mutually transversely extending tubular structural members. A tubular member having a body and a head is split lengthwise into complementary half sections resiliently connected together. The body fits within one structural member and the head is connected to the second structural member. A bolt passes through the second structural member and threadedly engages a plug in the body of the tubular member. Tightening of the bolt moves the plug axially in the body and causes the body to expand and grip the inner walls of the second structural member.

9 Claims, 7 Drawing Figures

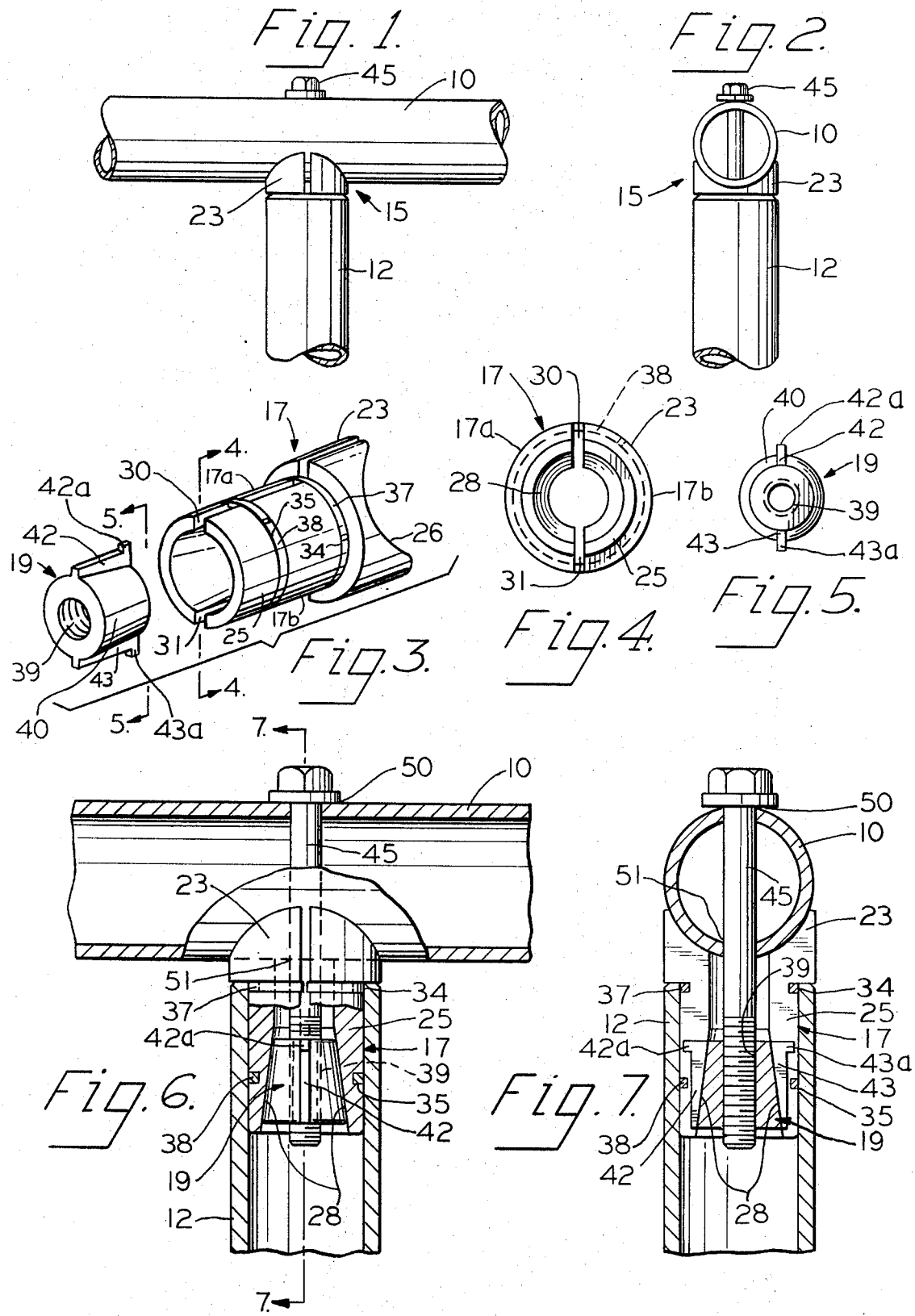

3,787,131

PIPE ANCHOR

BACKGROUND OF THE INVENTION

This invention relates to connections for structural members and more particularly to a device for connecting together a pair of tubular structural members.

Frames for various support structures such as scaffolds often are made of tubular members which combine strength with light weight. The tubular members in such a structure are usually connected together by welds which provide strong and generally reliable connections. Welding is, however, time consuming and expensive and requires skilled workmen as well as special equipment. Also, since a weld is a substantially permanent connection the weld-connected structure is a generally permanent structure and, unless small enough to be portable, is confined to use in one area.

In many cases, however, it is desirable to erect a support structure such as a scaffold quickly and inexpensively without the need for skilled workmen and with the ability to quickly disassemble the structure and move it to another location for yet another quick assembly. A weld obviously does not provide a suitable connection for the tubular members in such a structure. What is needed is a connecting device by which the tubular members can be connected quickly and reliably and without the need for skilled workmen and which is also quickly disconnectable to allow the structure to be disassembled and moved conveniently to a new location.

SUMMARY OF THE INVENTION

An object of this invention is to provide a device for quickly connecting and disconnecting tubular members.

Other objects are to provide such a device that is usable and is reliable and simple in use and inexpensive to manufacture.

These and other objects of the present invention are achieved by providing a device for connecting a pair of mutually transversely extending tubular structural members, the device including a tubular member having a head and an expansible body. The body is adapted to fit within an end of a first of the structural members. The head is adapted for supporting the body within the first structural member and for engaging the second of the structural members. Means adapted for connection to the second structural member are provided for expanding the body. The body of the tubular member is thus expandable into gripping engagement with the interior of the first structural member which is thereby connected to the second structural member.

BRIEF DESCRIPTION OF THE DRAWINGS

FIG. 1 is a side elevation of a pair of tubular structural members connected by the device of this invention.

FIG. 2 is an end view of the structural members and connecting device of FIG. 1.

FIG. 3 is a perspective view of the tubular member and plug of the connecting device.

FIG. 4 is a view of the tubular member on the line 4—4 of FIG. 3.

FIG. 5 is a view of the plug on the line 5—5 of FIG. 3.

FIG. 6 is a view similar to FIG. 1 partly in section showing a pair of tubular structural members connected by the device of the present invention.

FIG. 7 is a sectional view along the line 7—7 of FIG. 6.

DESCRIPTION OF THE PREFERRED EMBODIMENT

Referring now to the drawing, FIGS. 1 and 2 illustrate a pair of mutually transversely extending tubular structural members 10 and 12 connected by the device 15 of the present invention. The members 10 and 12 may be, for example, part of a support structure such as a scaffold which is intended to be quickly and reliably assembled for use and quickly and easily disassembled for convenient storage or transport to another location. Typically, the structural members 10 and 12 will be made of a mild steel. The connecting device 15 has a portion within structural member 12 and another portion engaging the outer surface of structural member 10 to connect the members as described below.

The principal elements of the connecting device of the present invention are shown in FIGS. 3 to 5 and include a tubular member generally indicated by the numeral 17 and a plug generally indicated by the numeral 19. The tubular member 17 includes a head 23 at its upper end and an expansible body 25 extending downwardly from the head. The head 23 is significantly larger in diameter than the body 25 and slightly larger in diameter than the tubular structural members 10 and 12 to be connected by the device 15. The top surface 26 of the head 23 is concave with a curvature corresponding to that of the structural members 10 and 12.

The body 25 of member 17 has an outer diameter slightly smaller than the inner diameter of structural members 10 and 12 so as to fit freely therein but with minimum clearnace. The bottom portion of the inner wall of body 25 is preferably tapered upwardly toward head 23 as shown most clearly at 28 in FIGS. 6 and 7.

The tubular member 17 is split lengthwise completely through the head 23 and the body 25 as indicated at 30 and 31. The lengthwise splits divide member 17 into complementary half sections 17a and 17b, each half section having a complementary part of head 23 and body 25. Body 25 is provided with a groove 34 immediately below shoulder 26 and a groove 35 about a third of the way from the bottom. Spring rings 37 and 38 fit within the grooves 34, 35 respectively and resiliently connect the half sections 17a and 17b.

The plug 19 is threaded interiorly as indicated at 39 and preferably has its exterior surface 40 tapered upwardly to correspond to the taper 28 of the inner walls of body 25 as shown clearly in FIGS. 6 and 7. Flanges 42 and 43 are provided on opposite sides of plug 19. Flanges 42 and 43 fit in the lengthwise slits 30 and 31 between portions 17a and 17b of tubular member 17 and prevent the plug 19 from rotating and guide it as it moves axially within body 25. The flanges 42 and 43 are provided with laterally extending projections 42a and 43a which project radially into splits 30 and 31, respectively, far enough to be engaged by spring ring 38 which serves as a stop to limit downward axial movement of plug 19 within body 25.

A threaded bolt or the like such as 45 in FIGS. 1, 2, 6 and 7 is adapted to extend through tubular member 17 and to be threadedly engaged with plug 19 to cause the plug to be drawn axially upwardly in body 25.

The tubular member 17 and the plug 19 are preferably made of a cold rolled steel. The flanges 42 and 43 are preferably made of the same meterial and are preferably formed separately and welded to the plug 19.

FIGS. 6 and 7 illustrate the use and operation of the present invention for connecting the mutually transversely extending tubular structural members 10 and 12. Prior to use of the connecting device the plug 19 is held somewhat loosely within the body 25 and is prevented from falling out of the body by the projections 42a and 43a which contact the spring steel ring 38.

In use, the connecting device 15 may be stored and carried separately from the tubular structural members or, if desired, the connecting device can be stored on the structural member 10 with the bolt 45 being passed through diametrically spaced holes 50 and 51 in structural member 10 and into threaded engagement with the plug 19. When the connecting device is carried by the structural member 10 in the latter fashion assembly of the support structure is particularly convenient. Each connection is made merely by fitting the structural member 12 over the body 25 of tubular member 17 until the upper edge of member 12 contacts the bottom surface of the head 23 and then tightening the bolt 45.

As the bolt 45 is tightened plug 19 is prevented from rotating by the flanges 42 and 43 and the projections 42a and 43a and the plug is pulled axially upwardly within the tapered walls 28 of body 25. The half sections 17a and 17b are caused to expand outwardly against the bias of the spring rings 37 and 38 and into tight frictional engagement with the inner surface of the structural member 12. A firm tightening of the bolt 45 produces a tight clamping engagement between the body 25 of tubular member 17 and the inner wall of the structural member so that the structural members 10 and 12 are tightly connected together and cannot accidently become disconnected. To provide better frictional engagement between the body 25 of member 17 and the inner wall of the structural member, the lower exterior surface of body 25 may be grooved or roughened or provided with raised portions.

If the connecting device 15 is not stored on the structural member 10 it is merely necessary to connect the device to member 10 by fitting the concave upper surface of head 23 onto member 10 and passing bolt 45 through holes 50 and 51 and into threaded engagement with plug 19. Connection then proceeds as described above.

When it is desired to disassemble the support structure the bolt 45 is merely turned out of plug 19 for a short way until it extends a short distance above the surface of structural member 10. A sharp tap downwardly on the head of bolt 45 will then move plug 19 axially downwardly in body 25 and allow the spring ring 37 and 38 to return the body to its normal unexpanded condition. The structural member 12 can then be removed from its engagement with body 25. The connecting device 15 can remain stored, if desired, upon structural member 10 ready for reassembly at a new location or the connecting device may be removed from structural member 10 merely by turning bolt 45 out of plug 19.

While the invention has particular application in joining tubular structural members of a scaffold or similar support structure it can be used with advantage in joining any tubular members made of essentially any metal or of plastic. The device itself can also be made of lighter metal such as aluminum or of plastic depending upon the nature of the tubular members to be joined and their intended use.

While a preferred form of the present invention has been described herein it will be apparent to those skilled in the art that modifications and improvements may be made to the form herein specifically disclosed. Accordingly, this invention is not to be limited to the form herein specifically disclosed nor in any other way inconsistent with the progress in the art promoted by the invention.

What is claimed is:

1. A device for connecting a pair of mutually transversely extending tubular structural members, said device comprising a tubular member having a head and a body extending from the head, said body being adapted to fit within an end of the first structural member, said head being adapted for supporting said body within said first structural member and for engaging a second structural member, said tubular member being split lengthwise to define first and second complementary half sections, spring means resiliently joining said half sections, a plug in said body movable axially with respect thereto, means for moving said plug to expand said body, and means on said plug adapted to contact said spring means to retain said plug in said body.

2. A device as claimed in claim 1 wherein the inner walls of said body are tapered toward said head and said plug is tapered to conform with said inner walls.

3. A device as claimed in claim 1 wherein said plug is provided with a threaded hole and said means for moving said plug axially with respect to said body includes a threaded member extending axially into said tubular member into threaded engagement with said plug.

4. A device as claimed in claim 1 including flanges carried by said plug and adapted to fit slidingly between said half sections to prevent rotation of said plug in said body.

5. A device as claimed in claim 4 wherein said plug retaining means includes projections extending radially outwardly from said flanges and adapted to contact said spring means to retain said plug in said body.

6. A device as claimed in claim 1 wherein the head of said tubular member seats upon the periphery of said first structural member to support said tubular member in said first structural member.

7. A device as claimed in claim 1 wherein the head of said tubular member has a concave surface conforming to the curvature of said second structural member for engagement therewith.

8. A device as claimed in claim 1 in combination with a pair of mutually transversely extending tubular structural members.

9. A device for connecting a pair of mutually transversely extending tubular structural members, said device comprising a tubular member having a head and an expansible body extending from the head, said body being adapted to fit within an end of a first structural member, said head being adapted for supporting said body within said first structural member and for engaging a second structural member, said tubular member being split lengthwise to define first and second complementary half sections, a spring steel ring resiliently joining said half sections, a plug in said body movable axially with respect thereto, flanges carried by said plug and adapted to fit slidingly between said half sections to prevent rotation of said plug in said body, projections extending radially outwardly from said flanges and adapted to contact said spring steel ring to retain said plug in said body, said plug having a threaded hole, and means for moving said plug axially to expand said body including a threaded member extending axially into said tubular member and into threaded engagement with said plug.

* * * * *